United States Patent
Stevens et al.

(10) Patent No.: US 10,911,550 B2
(45) Date of Patent: Feb. 2, 2021

(54) PARTIAL LOADING AND EDITING OF DOCUMENTS FROM A SERVER

(75) Inventors: Jeremy Max Stevens, Seattle, WA (US); Robert Rolnick, Redmond, WA (US); Zhenjun Zhu, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 641 days.

(21) Appl. No.: 12/942,118

(22) Filed: Nov. 9, 2010

(65) Prior Publication Data

US 2012/0117481 A1     May 10, 2012

(51) Int. Cl.
*G06F 3/00*     (2006.01)
*G06F 9/00*     (2006.01)
(Continued)

(52) U.S. Cl.
CPC .......... *H04L 67/18* (2013.01); *G06F 16/9577* (2019.01); *H04L 67/025* (2013.01)

(58) Field of Classification Search
CPC .... G06F 17/30905; G06F 9/4443; G06F 8/34; G06F 3/0486; G06F 8/38; G06F 3/04812; G06F 3/04847; G06F 16/9577; H04L 67/025; H04L 67/18; H04N 1/00389; H04N 1/00411
USPC ....... 715/513, 514, 515, 737, 738, 739, 762, 715/763, 764, 765, 864, 865, 866, 901, 715/902, 903, 907, 910
See application file for complete search history.

(56) References Cited

U.S. PATENT DOCUMENTS 5,715,441 A     2/1998 Atkinson
5,781,785 A *   7/1998 Rowe et al. .................. 715/234
(Continued)

FOREIGN PATENT DOCUMENTS

JP     10-293689 A     11/1998
JP     2002537597 A    11/2002
(Continued)

OTHER PUBLICATIONS

"Document Toolkit: using the WebPackageReader", published May 13, 2009, 4 pages.
(Continued)

*Primary Examiner* — Kieu D Vu
*Assistant Examiner* — Anita D. Chaudhuri
(74) *Attorney, Agent, or Firm* — Merchant & Gould P.C.

(57) ABSTRACT

On a client computer a request is sent to a server computer to open a first portion of a document. The document is stored at the server computer. The first portion of the document is smaller than the entire document. The request includes information used by the server computer to determine a size of the first portion of the document. The first portion of the document is received from the server computer. A second portion of the document is rendered on a display screen on the client computer. The second portion of the document is a subset of the first portion of the document. When the client computer determines that the user has scrolled a third portion of the document and that more of the document is available at the server computer, a second request is sent to the server computer to open an additional portion of the document.

18 Claims, 9 Drawing Sheets

(51) Int. Cl.
  *G06F 17/00* (2019.01)
  *H04L 29/08* (2006.01)
  *G06F 16/957* (2019.01)

(56) References Cited

U.S. PATENT DOCUMENTS

| | | | |
|---|---|---|---|
| 6,204,846 B1 | 3/2001 | Little et al. | |
| 6,249,804 B1* | 6/2001 | Lam | G06F 17/30902 |
| | | | 707/E17.12 |
| 6,658,452 B1 | 12/2003 | Becker et al. | |
| 6,658,462 B1 | 12/2003 | Dutta | |
| 6,754,621 B1* | 6/2004 | Cunningham | G06Q 40/04 |
| | | | 704/219 |
| 7,069,501 B2* | 6/2006 | Kunitake et al. | 715/234 |
| 7,228,496 B2 | 6/2007 | Hamada | |
| 2002/0062397 A1* | 5/2002 | Chang et al. | 709/246 |
| 2003/0011631 A1* | 1/2003 | Halahmi | 345/744 |
| 2004/0036912 A1 | 2/2004 | Liou et al. | |
| 2004/0230572 A1* | 11/2004 | Omoigui | G06F 17/30528 |
| 2006/0031760 A1* | 2/2006 | Jacobs | G06F 17/217 |
| | | | 715/251 |
| 2006/0038015 A1 | 2/2006 | Ise et al. | |
| 2006/0048051 A1 | 3/2006 | Lazaridis | |
| 2007/0157112 A1* | 7/2007 | Peters | 715/786 |
| 2008/0079972 A1* | 4/2008 | Goodwin | G06F 3/0485 |
| | | | 358/1.12 |
| 2008/0201452 A1 | 8/2008 | Athas et al. | |
| 2009/0083284 A1* | 3/2009 | Segawa et al. | 707/10 |
| 2009/0217352 A1 | 8/2009 | Shen | |
| 2010/0070448 A1* | 3/2010 | Omoigui | H01L 27/1463 |
| | | | 706/47 |
| 2010/0268736 A1 | 10/2010 | Ruhlen | |

FOREIGN PATENT DOCUMENTS

| | | |
|---|---|---|
| JP | 2004240877 A | 8/2004 |
| JP | 2006185155 A | 7/2006 |
| JP | 2006343846 A | 12/2006 |
| JP | 2007515096 A | 6/2007 |
| JP | 2009093374 A | 4/2009 |
| RU | 2398263 C2 | 8/2010 |
| RU | 2400811 C2 | 9/2010 |
| WO | 2012064588 A2 | 8/2012 |

OTHER PUBLICATIONS

"Terracotta DSO Data Structures Guide", published Jul. 2010, 8 pages.
"Web Content Management in SharePoint Server 2010", accessed at: http://blog.mastykarz.nl/web-content-management-sharepoint-server-2010/ , accessed on Aug. 17, 2010, 5 pages.
Cun et al.; DjVu Document Browsing with On-Demand Loading and Rendering of Image Components, published 2001; 10 pages.
de Lara et al.; "Collaboration and Document Editing on Bandwidth-Limited Devices", published 2001, 4 pages.
Chinese First Office Action for Application No. 201110364918.0 dated Feb. 12, 2014.
Chinese Second Office Action for Application No. 201110364918.0 dated Sep. 26, 2014.
European Search Report for Application No. 11839859.3 dated Oct. 28, 2014.
International Search Report and Written Opinion for Application No. PCT/US2011/059232 dated Jul. 2, 2012.
"Office Action Issued in Colombia Patent Application No. 13-138547", dated May 26, 2014, 8 Pages.
"Office Action Issued in European Patent Application No. 11839859.3", dated Apr. 29, 2015, 4 Pages.
"Office Action Issued in Chile Patent Application No. 201301240", dated Mar. 20, 2015, 5 Pages. (w/o English Translation).
"Office Action and Search Report Issued in Taiwan Patent Application No. 100135049", dated Nov. 26, 2015, 16 Pages.
"Office Action Issued in European Patent Application No. 11839859.3", dated Dec. 23, 2015, 5 Pages.
"Notice of Allowance Issued in Russian Patent Application No. 2013119971", dated Sep. 22, 2015, 13 Pages.
"Office Action Issued in Japanese Patent Application No. 2013-538793", dated Dec. 17, 2015, 11 Pages.
"Office Action Issued in Australian Patent Application No. 2011326270", dated Mar. 9, 2016, 3 Pages.
"Office Action Issued in Chile Patent Application No. 201301240", dated Sep. 8, 2015, 6 Pages.
"Office Action Issued in European Application No. 11839859.3", dated Feb. 10, 2017, 6 Pages.
"Office Action Issued in Argentina Patent Application No. P110104197", dated Jan. 30, 2017, 8 Pages.
"Office Action Issued in Japanese Patent Application No. 2013-538793", dated Aug. 25, 2016, 9 Pages.
"Office Action Issued in Argentina Patent Application No. P110104197", dated Oct. 6, 2016, 9 Pages.
"Office Action Issued in Israel Patent Application No. 225997", dated Aug. 15, 2016, 2 Pages.
"Office Action Issued in Argentina Patent Application No. P110104197", dated Jun. 15, 2017, 8 Pages.
"Office Action Issued in Canadian Patent Application No. 2,815,929", dated Aug. 22, 2017, 5 Pages.
"Office Action Issued in Korean Patent Application No. 10-2013-7011950", dated Dec. 20, 2017, 15 Pages.
Office Action Issued in Japanese Patent Application No. 2017-015414, dated Feb. 8, 2018, 12 Pages.
"Final Office Action Issued in Korean Patent Application No. 10-2013-7011950", dated Aug. 22, 2018, 6 Pages.
"First Office Action Issued in Korean Patent Application No. 10-2013-7011950", dated Jun. 21, 2018, 7 Pages.
"Office Action Issued in Canadian Patent Application No. 2,815,929", dated May 18, 2018, 5 Pages.
"Office Action Issued in Japanese Patent Application No. 2017-015444", dated Aug. 13, 2018, 8 Pages.
"Examination Report Issued in Indian Patent Application No. 3269/CHENP/2013", dated Jul. 2, 2019, 8 Pages.
Office Action Issued in Canadian Patent Application No. 2,815,929, dated Jan. 25, 2019, 4 Pages.

\* cited by examiner

200

┌─────────────────────────────────────┐
│  ┌───────────────────────────────┐  │
│  │      Paragraph 202            │  │
│  │       (ID # 100)              │  │
│  └───────────────────────────────┘  │
│                                     │
│  ┌───────────────────────────────┐  │
│  │                               │  │
│  │      Paragraph 204            │  │
│  │       (ID # 200)              │  │
│  │                               │  │
│  └───────────────────────────────┘  │
│                                     │
│  ┌───────────────────────────────┐  │
│  │                               │  │
│  │      Paragraph 206            │  │
│  │       (ID # 300)              │  │
│  │                               │  │
│  └───────────────────────────────┘  │
│                                     │
│  ┌───────────────────────────────┐  │
│  │                               │  │
│  │        Table 208              │  │
│  │       (ID # 400)              │  │
│  │                               │  │
│  └───────────────────────────────┘  │
│                                     │
│  ┌───────────────────────────────┐  │
│  │      Paragraph 210            │  │
│  │       (ID # 500)              │  │
│  └───────────────────────────────┘  │
└─────────────────────────────────────┘

FIG. 2

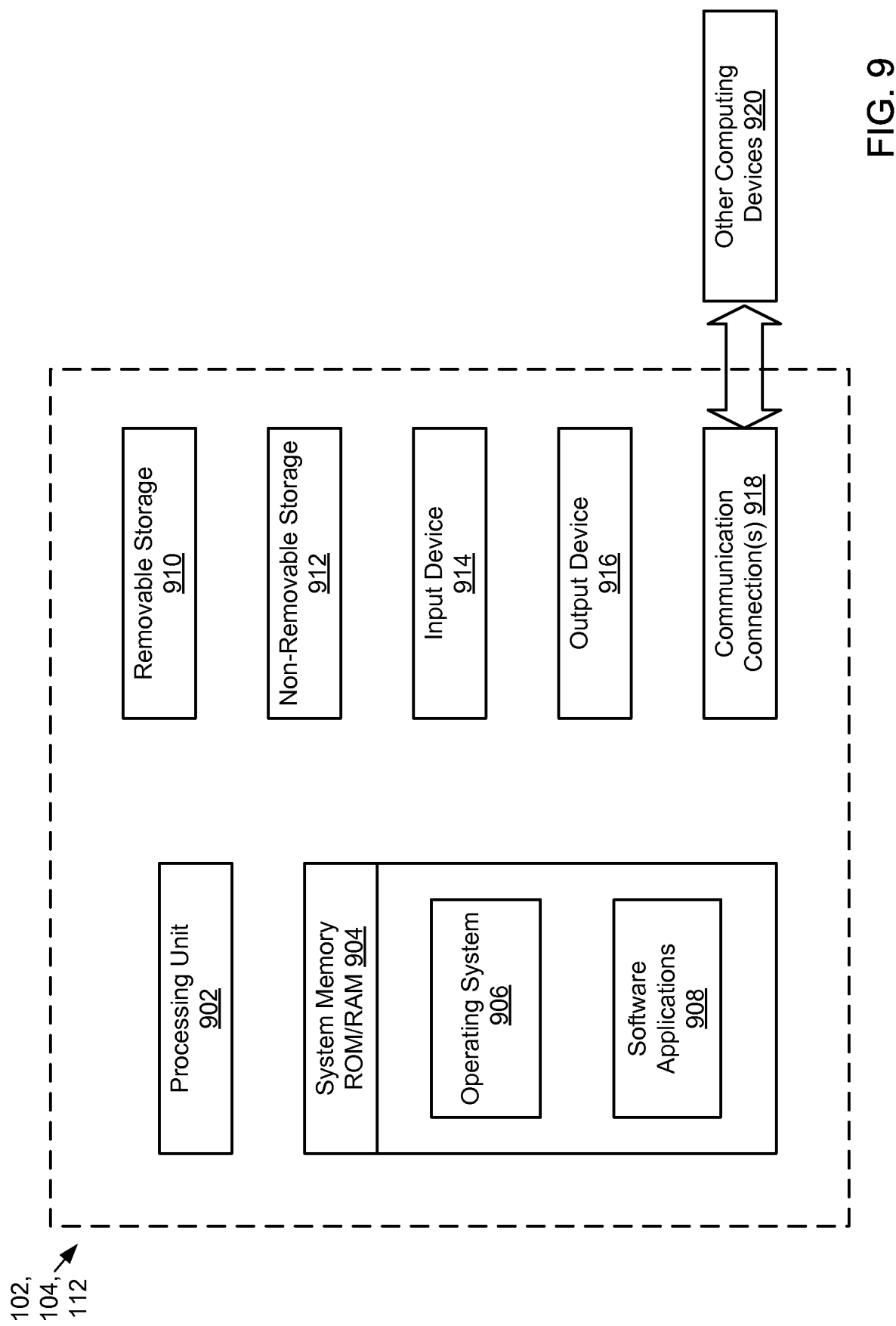

PARTIAL LOADING AND EDITING OF DOCUMENTS FROM A SERVER

BACKGROUND

Documents accessed by client computers are commonly stored on server computers or databases across a network. Typical document accesses include viewing a document stored on a server computer via a web browser on a client computer and editing a document stored on a server computer via an application program on a client computer.

When accessing a document on a client computer across a network, time delays may occur due to transmission distances, document length and other factors.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments of the disclosure are directed to a method for accessing a document at a client computer. At the client computer, a first request is sent to a server computer to open a first portion of the document. The document is stored at the server computer. The first portion of the document is smaller than the entire document. The request includes information that is used by the server computer to determine a size of the first portion of the document. At the client computer, the first portion of the document is received from the server computer. After the first portion of the document is received from the server computer, a second portion of the document is rendered on a display screen on the client computer. The second portion of the document is a subset of the first portion of the document. At the client computer, a determination is made that more of the document is available at the server computer. At the client computer, a determination is made that a user has scrolled a third portion of the document on a display screen at the client computer. When the client computer determines that the user has scrolled the third portion of the document and when the client computer determines that more of the document is available at the server computer, a second request is sent to the server computer to open an additional portion of the document.

These and other features and advantages will be apparent from a reading of the following detailed description and a review of the associated drawings. It is to be understood that both the foregoing general description and the following detailed description are explanatory only and are not restrictive of aspects as claimed.

DESCRIPTION OF THE DRAWINGS

FIG. 2 shows a page of an example document that is stored on the server computer of FIG. 1.

FIG. 9 shows example components of the client computers and server computer of FIG. 1.

DETAILED DESCRIPTION

The present application is directed to systems and methods for partial loading and editing of documents stored on a server computer.

In example embodiments, when a document stored on a server computer is accessed on a client computer, the server computer opens only a portion of the document and sends the open portion of the document to the client computer. The size of the portion of the document that is open typically corresponds to the size of the document that can fit on a display screen on the client computer plus a little more of the document to permit scrolling. The portion of the document that is opened is loaded into memory on the client computer. By opening only a portion of the document instead of the entire document and loading this portion of the document on the client computer, the document can be rendered on the client computer faster than if the entire document was opened.

In this disclosure, opening a portion of a document refers to obtaining a handle to the document at a server computer and sending a portion of the document to a client computer.

Figure 1:
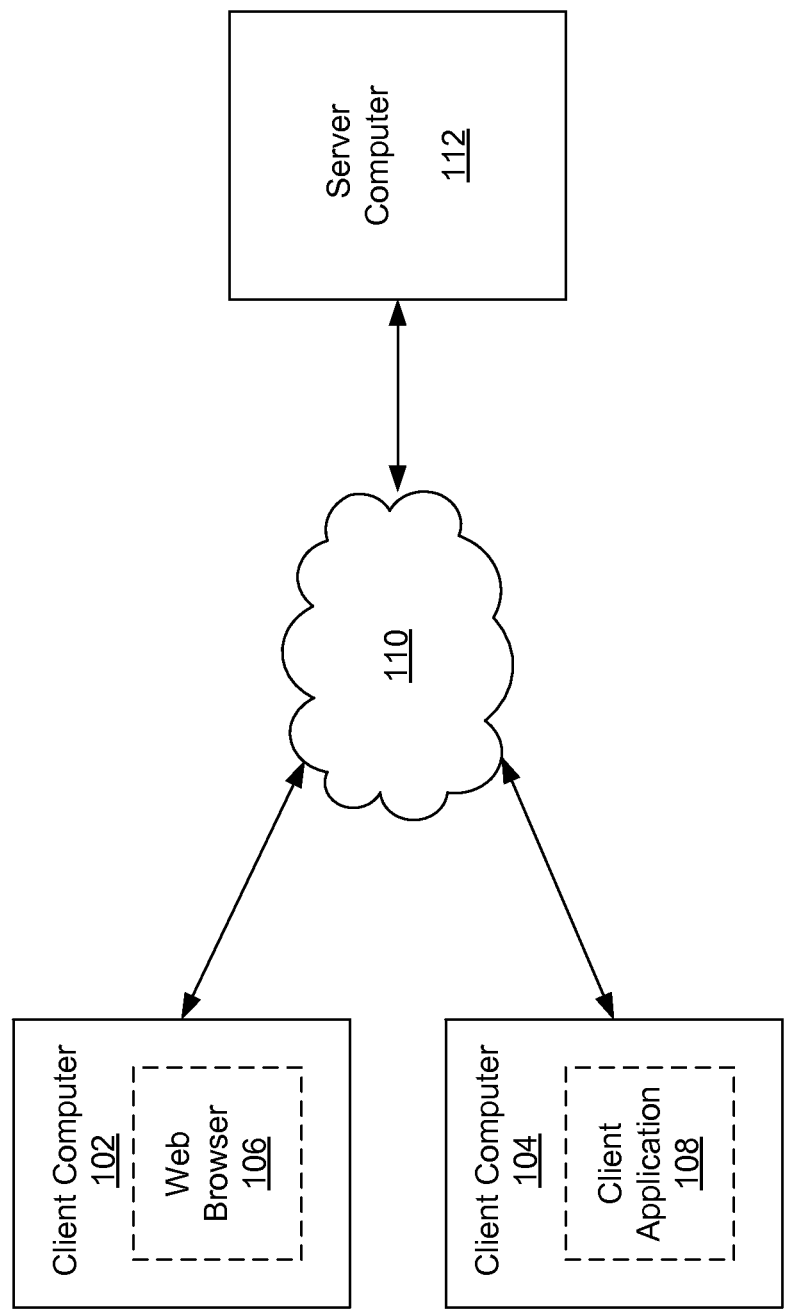
FIG. 1 shows an example system used in accessing documents over a network.

FIG. 1 shows an example system 100 used in accessing documents over a network. The example system 100 includes client computers 102, 104, network 110 and server computer 112. More or fewer client computers and server computers can be used.

Server computer 112 is accessible to client computers 102 and 104 via network 110. Examples of network 110 are the Internet and a corporate Intranet. Other examples of network 110 are possible.

The example client computer 102 includes a web browser 106 and the example client computer 104 includes a client software application 108. An example client software application is the Microsoft Word® 2010 word processing program from Microsoft Corporation of Redmond, Wash.

When a document stored on server computer 112 is accessed by web browser 106 on client computer 102, client computer 102 sends a request to open the document to server computer 112. The request typically includes one or more parameters relating to the display of information on client computer 102. For example, one parameter may specify the size of a display screen on client computer 102 on which the document is to be rendered. Another parameter may specify the font size in which the document is to be rendered. A third parameter may specify the display screen resolution in pixels. Other example parameters may be used.

When the example server computer 112 receives the request to open the document, the server computer 112 determines that the document is to be partially opened. In some examples, the server computer 112 determines that the document is to be partially opened by the presence of the one or more parameters relating to the display of information on client computer 102. In other examples, the request to open the document may include a function code specifying that the document is to be partially opened. Other means for the server computer 112 to determine that the document should be partially opened are possible.

The server computer 112 uses the information included in the one or more parameters to determine how much of the document is to be sent to client computer 102. The server computer 112 determines how much of the document will fit into the size of the display screen on client computer 102. When the server computer 112 determines how much of the document will fit into the size of the display screen on client computer 102, the server computer 112 opens the document for the determined size plus an additional size. The additional size represents a part of the document that is to be loaded onto the client computer 102 but not presently displayed. For example, when opening a document, the additional size may correspond to one display screen below the initial part of the document that fits onto one display screen. When a user at client computer 102 scrolls past the first displayed screen of the document, the second screen of the document is already loaded and ready to display.

When the server computer 112 determines how much of the document to open, the server computer 112 sends the portion of the document that the server computer 112 has opened to client computer 102. When client computer 102 receives the portion of the document from server computer 112, client computer 102 loads the received portion of the document into memory on client computer 102. Client computer 102 then renders the first page of the document on the display screen on client computer 102.

FIG. 2 shows a page of an example document 200 that is stored on server computer 112. The page of the example document 200 includes five top-level objects—four paragraphs and one table. As used in this disclosure, an object is a specific component of a document. Example objects include paragraphs, tables, pictures, sentences, words, table cells and hyperlinks. Other example objects are possible. Objects such as paragraphs, tables and pictures are designated as top-level objects because they may include additional embedded objects. For example, a paragraph object may include one or more sentence objects. Other top-level objects are possible. Each top-level object has a unique identifier. Thus, each paragraph, sentence, word, picture, table and table cell, etc. in a document is uniquely identified.

The first top-level object in example document 200 is paragraph 202. Example paragraph 202 is identified by ID #100. Other top-level objects in document 200 include paragraph 204 (ID #200), paragraph 206 (ID #300), table 208 (ID #400) and paragraph 210 (ID #500). In examples, objects embedded within another object, such as sentences in paragraphs or words in sentences may have an ID associated with a higher-level object. For example, the first sentence in paragraph 202 may be identified by 110 and the first word in the first sentence may be identified by 101. In examples, the ID numbers may be of a different format. Identifying each object in a document with a unique ID facilitates the editing of the document, as will be discussed in greater detail herein.

Documents are typically stored on server computer 112 in a format native to the document. For example, a Microsoft Word® word processing document is typically stored in a format consistent with a Word® word processing document. For some versions of the Microsoft Word® word processing application, the format may be XML. For other versions of the Microsoft Word® word processing application, the format may be proprietary. However, when the Word® word processing document is rendered on the web browser of client computer 102, the Word® word processing document is rendered in a format consistent with the web browser, for example an HTML format. Server computer 112 sends an open portion of the document to client computer 102 in a format that the client computer 102 can convert to HTML. In examples, when server computer 112 opens a portion of the document to be rendered on client computer 102, the server computer 112 may transform the document from Word® word processing format to XML format. Server computer 112 then sends the open portion of the document to client computer 102 in XML format.

When server computer 112 determines the portion of the document to open, server computer 112 determines a threshold for the number of objects to be included in the open portion of the document. Server computer 112 may determine the object threshold via one of several methods. In one method, server computer 112 obtains information regarding the display screen of client computer 102, as provided in the one or more parameters sent from client computer 102 to server 112 in the request to open the document.

Display screen information included in the one or more parameters may include the size of the display screen, the size of the font being used on the display screen and the display screen resolution in pixels. Using the display screen information, server computer 112 determines the number of objects that will fit on the display screen. In another method, the number of objects that will fit on the display screen is determined from a hint included in the request message from client computer 102 to open the portion of the document.

Server computer 112 then determines an additional number of objects, typically corresponding to one or two additional display screen sizes. The object threshold corresponds to the sum of the number of objects that will fit on the display screen plus the additional number of objects. The portion of the document corresponding to the one or two additional display screen sizes permits a user at client computer 102 to scroll pages and have adjacent pages rendered from memory on client computer 102. Other methods for calculating the object threshold are possible.

Server computer 112 opens a portion of the document corresponding to the object threshold size and starts sending objects from the document to client computer 102. When the object threshold is reached, server computer 112 continues sending objects to client computer 102 until the end of a top-level object is reached. Sending until the end of a top-level object is reached ensures that the open portion of the document breaks on top-level objects, instead of breaking in the middle of a paragraph or table, for example. When the object threshold is reached and when the end of a top-level object is reached, server computer 112 stops sending objects to client computer 102.

Figure 3:
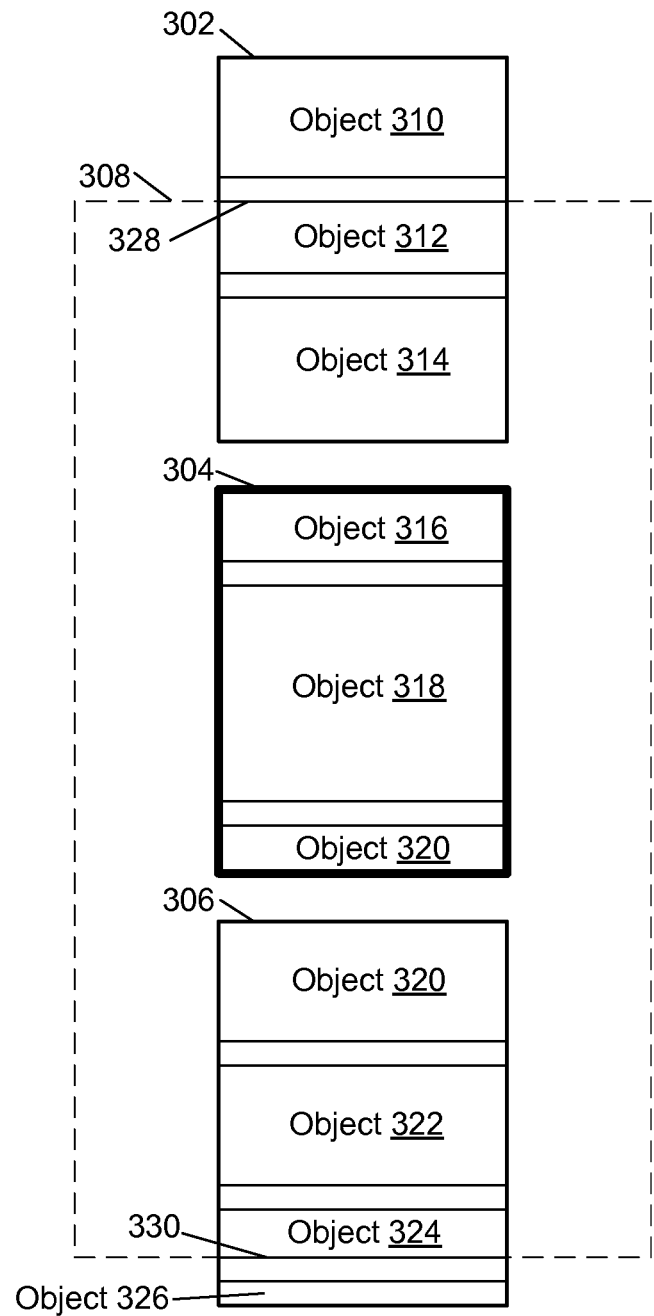
FIG. 3 shows an example document storage in an example memory area on a client computer of FIG. 1.

FIG. 3 shows an illustration of the use of a memory area 308 on client computer 102 to load and store the open portion of the document transmitted from server computer 112 to client computer 102. The memory area 308 is variable in size to accommodate different top-level object sizes. The example memory area 308 stores data from parts of three pages from the open portion of a document. In other examples a different memory size comprising more or fewer pages of parts of pages may be stored.

In FIG. 3, page 304, shown with a heavy black line border, corresponds to a page of document data rendered on client computer 102. Page 304 includes three example top-level objects—objects 316, 318 and 320. Page 302 corresponds to a page of the document preceding page 304 and page 306 corresponds to the page of the document following page 304. In FIG. 3, only a portion of pages 302 and 306 are actually loaded into the memory area 308 on client computer 102. For example, objects 312 and 314 of page 302 are loaded into memory area 308, but object 310 is not. Similarly, objects 320, 322 and 324 are loaded into memory area 308, but object 326 is not.

As discussed earlier, the server computer 112 typically sends open document data to client computer 102 corresponding to one page of rendered data plus an additional section of the document. In FIG. 3, page 304 corresponds to the rendered page. Objects 312 and 314 of page 302 and objects 320, 322 and 324 of page 306 correspond to the additional section of the document. The reason for loading and storing the additional section of the document is to permit smooth scrolling of the document by the user.

For example, if the user scrolls down past the bottom of page 304, object 320, already stored in memory on the client computer 102, is available for viewing without any additional downloading. Similarly if the user scrolls up past the top of page 304, object 314 is also already stored in memory on the client computer 102 and is also available for viewing without any additional downloading.

As shown in FIG. 3, the first object loaded and stored in memory area 308 is object 312 and the last object loaded and stored in memory area 308 is object 324. Memory area 308 stores complete top-level objects. The top of memory area 308, designated by item 328, corresponds to the first line of top-level object 312. Similarly, the bottom of memory area 308, designated by item 330, corresponds to the last line of top-level object 324. When the user scrolls down to the bottom of page 304 so that part of page 306 is rendered on the display screen of client computer 102, object 312 may move out of memory area 308 and object 326 may move into memory area 308.

In this way, memory area 308 adjusts in size to include new top-level objects and to remove old top-level objects. Further, as discussed below, the top-level objects removed from memory area 308 may be unloaded from client computer 102 and additional objects may be received from server computer 112 and stored in memory area 308.

Figure 4:
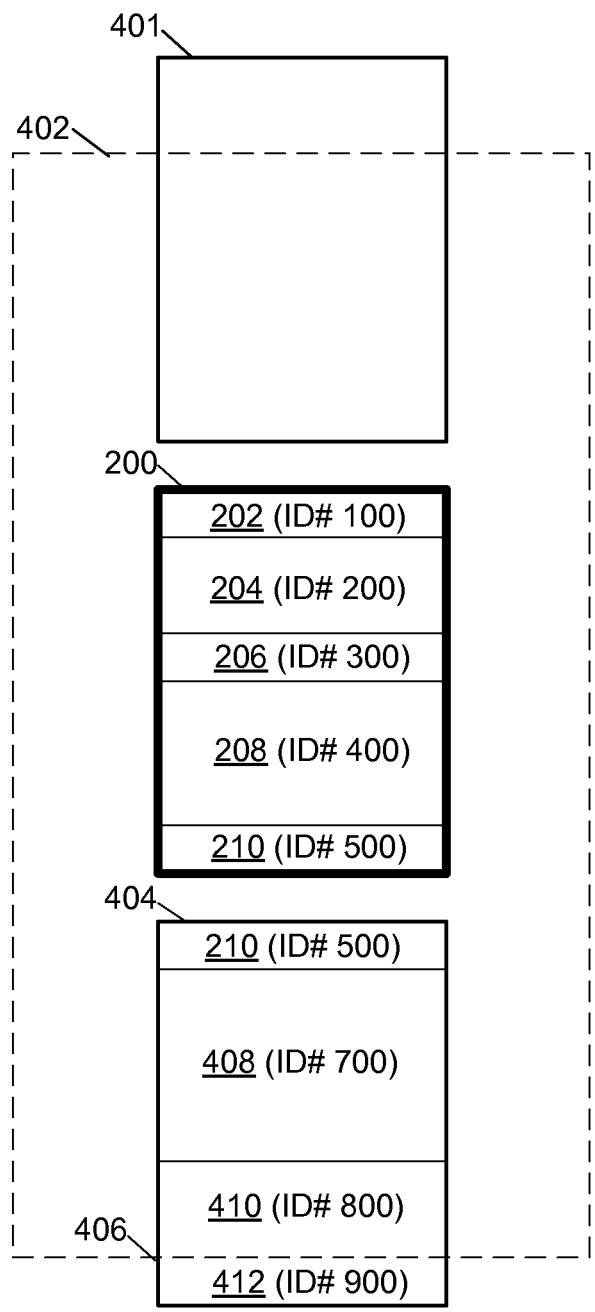
FIG. 4 shows another example of document storage in the example memory area on a client computer of FIG. 1.

FIG. 4, shows an example of a memory area 402 on client computer 102 corresponding to when a portion of the document in FIG. 2 is initially opened at client computer 102 and received from server computer 112. The example portion of the document loaded and stored in memory area 402 includes the first page of the document 200 and part of the second page 404 of the document. In examples, the entire second page 404 of the document may be loaded and stored in memory area 402.

The first page of the document 200 is rendered on the display screen of client computer 102. Typically, a page or part of a page of the document preceding the rendered page is also loaded and stored in memory area 402. However, for this example, because the rendered page is the first page of the document, there is no content to be loaded that precedes the first page. In this example, this is indicated by a blank page 401 preceding the first page of the document 200. In this example, the part of memory area 402 above where page 200 is loaded is not used in order to allow memory space for storing page 200 when a user scrolls to the bottom of page 200 and on to page 402. The implementation of scrolling in memory area 402 will be discussed in greater detail herein.

As shown in FIG. 4, the first page 200 of the document includes objects 202, 204, 206 and 208 and part of object 210. The second page 404 of the document includes the remaining part of object 210 and also includes 408, 410 and 412. However, in this example, because only a part of the second page 404 of the document is loaded, object 412 falls below memory area 402 and is not actually loaded and stored on client computer 102 at this time. Object 412 is shown in FIG. 4 to illustrate that object 412 is part of page 404.

The objects 202, 204, 206, 208, 210, 408, 410 and 412 are all top-level objects, meaning, for this example, that they comprise objects such as paragraphs, tables, lists or pictures. When server computer 112 determines the size of the portion of the document to open based on the object threshold calculated by server computer 112, server computer continues past the object corresponding to the object threshold until the end of the top-level object that includes the object corresponding to the object threshold. As shown in FIG. 4, the last top-level object loaded and stored in the memory area 402 is object 410. The last line 406 of the object 410 corresponds to the end of memory area 402.

When the server computer 112 sends the portion of the document to the client computer 102, the server computer 112 also provides an indication that more of the document may be available at server computer 112. The server computer 112 may provide an indication that more of the document is available by setting a flag in the message used to send the portion of the document to the client computer 102. The flag is typically set when more of the document is available. Instead of using a flag, the server computer 112 may include in the message the ID of the last object in the portion of the document sent and the ID of the last object in the document. By evaluating the IDs, client computer 102 may determine whether more of the document is available from server computer 112. The messages sent between client computer 102 and server computer 112 are standard web-based messages using the HTTP communication protocol.

When a user starts scrolling through the rendered document and the entire document has not been loaded onto client computer 102, client computer 102 determines that more of the document needs to be opened and downloaded to client computer 102. The client computer 102 determines that more of the document needs to be obtained based on the degree of scrolling. In examples, the client calculates the number of top-level objects that have been scrolled and when the number of top-level objects that have been scrolled are greater than a threshold, for example a threshold corresponding to half a page of rendered data, client computer 102 requests an additional portion of the document from the server computer 112. In examples, the threshold may be more or less than half a page. For example, the threshold may be one page or three quarters of a page.

Figure 5:
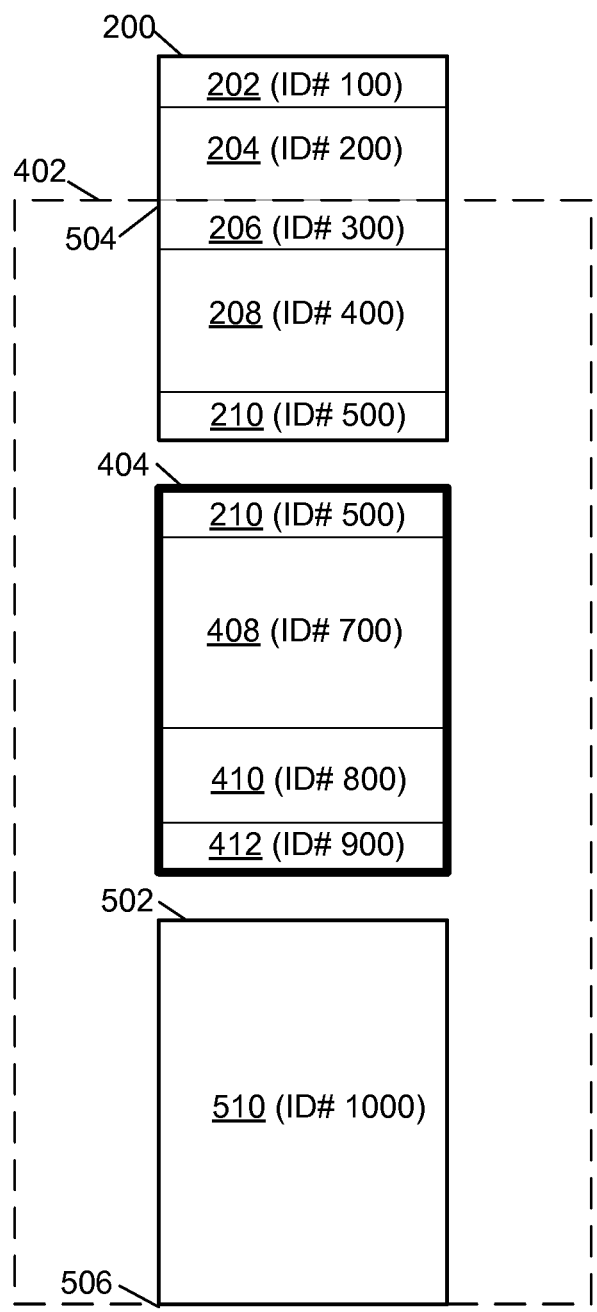
FIG. 5 shows still another example of document storage in the example memory area on a client computer of FIG. 1.

FIG. 5 shows the example memory area 402 when the user scrolls down one page in the document. As shown in FIG. 5, the portion of the document rendered to the user is page 404 comprising objects 408, 410 and 412 and part of object 210. The top of the memory area 402 is adjusted to the top line 504 of object 206. Objects 202 and 204 are now outside memory area 402. In examples, when objects are moved outside of memory area 402 as a result of scrolling, the objects may be unloaded from client computer 102 in order to conserve memory resources on client computer 102. For example, memory objects 202 and 204 may be unloaded by client computer 102. When memory objects 202 and 204 are unloaded by client computer 102, these memory objects need to be obtained again from server computer 112 when the user scrolls to the top of the document.

FIG. 5 also shows that as a result of scrolling one page down in the document, the server computer 112 loads the next page in the document, represented by page 502, to memory area 402. In this example, the next page in the document is a picture, corresponding to object 510. Because the server computer 112 sends top-level objects to client computer 102, the bottom of the memory area 402 is adjusted to the last line 506 of the object 510.

In examples, the server computer 112 sends the next page of the document (corresponding to object 506) as a result of a request message from the client computer 102. The client computer sends the request message to the server computer 102 when the client computer 102 detects that the user has scrolled down one page. The request message instructs the server computer 112 to open up an additional portion of the document, in this case corresponding to one page, and send the additional portion of the document to client computer 102. In examples, the client computer 102 may issue the request to server computer 112 as a result of the user scrolling more or less than one page.

In addition to scrolling and viewing portions of a document on the client computer 102, the user may edit one or more portions of the document or add content to the document. As discussed, each object in the document is identified by a unique ID number. When a user edits a portion of the document, the edited objects are identified and updated for the open portion of the document at the server computer 112. If a new object is added, for example a new word, sentence or paragraph, an ID number is generated for the word, sentence or paragraph. In examples, the ID numbers of existing objects may be adjusted to reflect the position of an added word, sentence or paragraph. In addition, because only a portion of the document is opened and the IDs of the edited objects are known, the document may be edited and the changes saved to the server computer 112 without needing to open the entire document.

Figure 6:
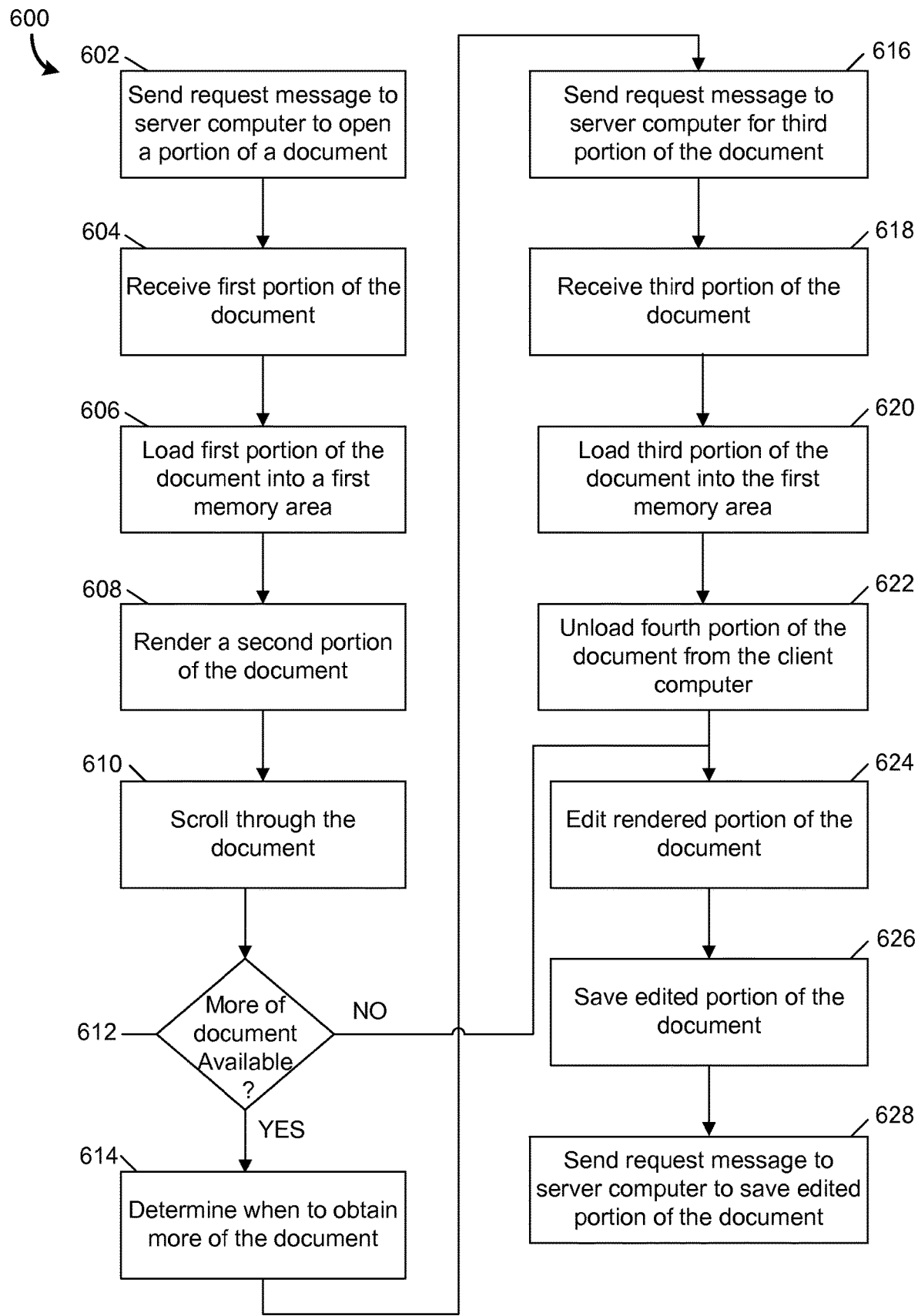
FIG. 6 shows an example method for opening a portion of a document at a client computer

FIG. 6 shows an example flowchart of a method 600 for opening a portion of a document at a client computer. For example, the portion of the document may be open in web browser 106 at client computer 102. Alternatively, the portion of the document may be open in a client application, for example in the Microsoft Word® word processing application 108 at client computer 104. The document to be open is stored on a server computer, for example server computer 112.

At operation 602, a request message is sent from client computer 102 to server computer 112 to open a portion of the document. The request message includes information indicating the size of the portion of the document to open. For example, the request message may include a hint indicating a number of objects to be included in the portion of the document. Alternatively, the request message may include one or more parameters providing information regarding the display of information at client computer 102. The information may include such items as the display screen size, the font size and the display resolution in pixels.

At operation 604, the first portion of the document is received from server computer 112. The first portion of the document typically includes the first page of the document, plus an additional amount of the document, typically a page or a portion of a page. In examples, the size of the first portion of the document may include more or less than this size. The reason for including more than a page of the document is to permit a user at client computer 102 to scroll past the first page and for the second page, or part of the second page, to be quickly displayed from memory on client computer 102.

In addition to sending the first portion of the document, the server computer 112 also indicates to the client computer whether more of the document is available. The server computer 112 may indicate that more of the document is available by setting a flag in the message sent from server computer 112 to client computer 102. Other methods for indicating that more of the document is available are possible. For example, the server computer 112 may include the ID of the last object in the document and the ID of the last object in the portion sent. The client computer 102 may then compare IDs to determine that more of the document is available.

At operation 606, the first portion of the document received from server computer 112 is loaded into a first memory area on client computer 102. The first memory area is an area of memory on client computer 102 dedicated to storing a portion of a document. Typically, the memory area is large enough to store two or three pages of the document, although in examples, the memory area may store more or less than two or three pages of the document. A memory area large enough to store two pages of the document permits a current page to be stored plus half of the preceding page and half of the following page. A memory area large enough to store three pages permits a current page to be stored plus the entire preceding page and the entire following page. In examples, the memory area is known as a viewport because the portion of the document is rendered from the memory area.

The portion of the document obtained from server computer 112 and stored in the memory area is comprised of one or more objects. Each object represents a specific part of the document, such as a word, sentence, paragraph, table, table cell, etc. Each object has a unique ID. In addition, one or more of the objects are designated as top-level objects. Top-level objects are objects in the document comprising one or more other objects. For example, a paragraph is a top-level object that includes one or more sentence objects and word objects.

The objects in the portion of the document stored in the memory area are arranged on top-level object boundaries. Thus, the memory area begins with the first line of a top-level object and the memory area ends with the last line of a top-level object. Top-level objects are typically comprised of one or more lines of XML code. The memory area is adjustable in size to adjust for the size of the last top-level object in the memory area.

At operation 608, a second portion of the document is rendered on the display screen of client computer 102. Typically, the second portion comprises a page of document data. The second portion of the document is rendered from the memory area on client computer 102 and comprises a part of the first portion of the document. Page 200 of FIG. 4 and page 404 of FIG. 5 are examples of pages of the document rendered from the memory area of client computer 102.

At operation 610, the user scrolls through the document. At operation 612, a determination is made as to whether more of the document is available on the server computer 112. In examples, the determination may involve checking the status of a flag in the message sent from the server computer 112 to client computer 102 with the first portion of the document at operation 604. In other examples, client computer 102 may compare the last ID in the portion of the document sent from server computer 112 with the last ID in the document.

At operation 614, when a determination is made that more of the document is available on server computer 112, client computer 102 determines when to obtain more of the document from server computer 112. In examples, client computer determines to obtain more of the document from server computer 112 after a page of the document has been scrolled by the user. In other examples, client computer determines to obtain more of the document from server computer 112 whenever the user scrolls any part of the document on client computer 102. Other examples are possible.

At operation 616, when a determination is made at client computer 102 to obtain more of the document from server computer 112, client computer 102 sends a request message to server computer 112 for a third portion of the document. The request message includes information about the size of the third portion of the document. In examples, the information regarding the size of the document may include a hint as to the number of objects to include in the third portion of the document. In examples, the information regarding the size of the document may include one or more parameters indicating the amount to which the document rendered on client computer 102 is scrolled. The server computer 112 uses the information regarding the size of the document to determine the size of the third portion of the document.

At operation 618, the third portion of the document is received from server computer 112. At operation 620, the third portion of the document is loaded into the first memory area. When the third portion of the document is loaded into the first memory area, because the user scrolled down the document, the third portion of the document is added to end of the first memory area. The first memory area expands in size to accommodate the size of the third portion of the document. The end of the third portion of the document is a top-level object and the end of this top-level object corresponds to the end of the first memory area.

In examples, when the third portion of the document is added to the first memory area, a portion of the document similar in size to the third portion of the document is typically unloaded from the first memory area. Unloading a portion of the document from the first memory area reduces memory consumption on client computer 102.

At operation 622, a fourth portion of the document is unloaded from the first memory area. The fourth portion of the document is a subset of the first portion of the document. As discussed above, the fourth portion of the document is typically similar in size to the third portion of the document. The fourth portion of the document is typically similar in size to the third portion of the document, but not identical to the third portion of the document because the first memory area ends on a top-level object and the size of the top-level objects in the first and third portions of the document may differ. The unloading of the fourth portion of the document from the first memory area when the third portion of the document is added to the first memory area regulates memory consumption on client computer 102.

At operation 624, the user edits the portion of the document rendered on client computer 102. In examples, the document may be edited any time the document is displayed on client computer 102. This includes a time when the document is initially displayed or after the document is scrolled. Although FIG. 6 shows the document being edited when no more of the document is available from server computer 112, this is just one example of when the document may be edited.

At operation 626, the user saves the edited portion of the document at client computer 102. The user typically saves the edited portion of the document by pressing or clicking on a save button on client computer 102. At operation 628, client computer 102 sends a request message to server computer 112 to request that server computer 112 save the edited portion of the document. Server computer 112 saves the edited portion of the document without needing to open or save the entire document. Only the portion of the document that is opened is saved.

Figure 7:
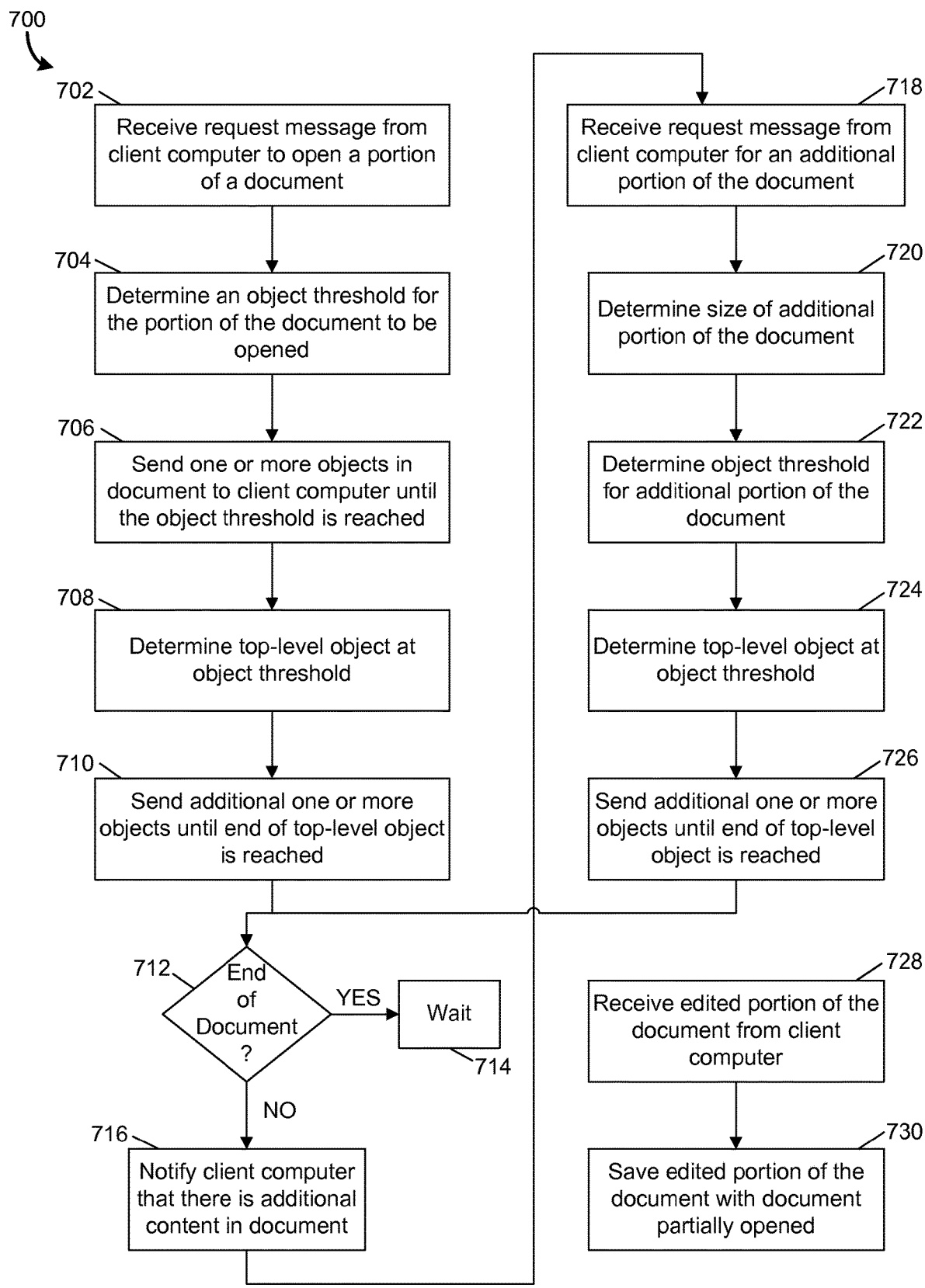
FIG. 7 shows an example method for opening a portion of a document at a server computer.

FIG. 7 shows an example flowchart of a method 700 for opening a portion of a document at a server computer, for example at server computer 112. At operation 702, server computer 112 receives a request message from client computer 102 to open portion of a document stored on server computer 112. The request message includes information regarding the size of the portion of the document to be opened. In examples, the information may include a hint as to the number of objects in the document to open. In other examples, the information may include one or more parameters specifying information such as the size of the display screen on client computer 102, the font size being used on client computer 102, the display screen resolution, etc.

At operation 704, server computer 112 determines an object threshold for the portion of the document to be opened. The object threshold identifies a number of objects to be included in the portion of the document to be opened. When a hint as to the object threshold is not provided by the client computer 102, the object threshold is typically calculated by determining the number of objects in the document that fit in the size of one display screen on client computer 102 plus an additional number of objects. The additional number of objects is typically a multiple of the number of objects that fit in the size of one display screen.

At operation 706, server computer 112 opens the requested document and sends one or more objects in the document to client computer 102 until the object threshold is reached. Each object is transformed to the format needed at client computer 102 before the object is sent to client computer 102. For example, each object in Word® format may be transformed to XML format.

When the object threshold is reached, at operation 708 server computer 112 determines the top-level object that corresponds to the object corresponding to the object threshold. When there are more objects in the object corresponding to the object threshold, at operation 710, the server computer 112 continues sending objects to client computer 102 until the last object in the top-level object is reached.

At operation 712, a determination is made as to whether the end of the document is reached. At operation 712, when it is determined that the end of the document has been reached, at operation 714 the server computer 112 waits for further action from client computer 102. The further action could be to save an edited portion of the document, to close the document, etc.

At operation 712, when is determined that the end of the document has not been reached, at operation 716, server computer 112 notifies client computer 102 that there is additional content in the document. Server computer 112 typically sends the notification via a message to client computer 102. In examples, instead of sending a notification in a new message, the notification may be included with a message that includes document content, for example a message from operations 706 or 710. In other examples, client computer may send a message to server computer 112 inquiring whether additional content in the document is available; server 112 may send the notification to client computer 102 in response to the inquiry message.

At operation 718, server computer 112 receives a request message from client computer 102 for an additional portion of the document. The request message typically includes information as to the size of the additional portion of the document. In examples, the information may be a hint as to a number of objects to include in the additional portion of the document. In other examples, the information may include a number of pages or parts of a page to open. Other examples are possible.

At operation 720, server computer 112 determines the size of the additional portion of the document. Server computer 112 typically uses the information included in the request message to determine the size of the additional portion of the document. In examples, the size of an additional portion of the document may be configured or hard coded on server computer 112.

At operation 722, an object threshold is determined for the additional portion of the document. The object threshold corresponds to a number of objects to be included in the additional portion of the document. When the number of objects to be included in the additional portion of the document is reached, at operation 724, server computer 112 determines the top-level object that comprises the object at the object threshold. At operation 726, the server computer 112 sends one or more objects from the additional portion of the document to client computer 102. Server computer 112 sends the one or more objects to client computer 102 until the object threshold is reached. When the object threshold is reached, server computer 102 continues to send objects to client computer 102 until the last object is reached in the top-level object that corresponds to the object at the object threshold.

At operation 728, server computer 112 receives an edited portion of the document from client computer 102. The edited portion of the document may include one or more edited objects or one or more newly added or deleted objects. Because each object has a unique object ID, when one or more objects are newly added or deleted, object IDs in the document are adjusted depending on the position of the newly added or deleted objects.

At operation 730, the edited portion of the document is saved at server computer 112. The edited portion of the document is saved without needing to open the entire document.

Figure 8:
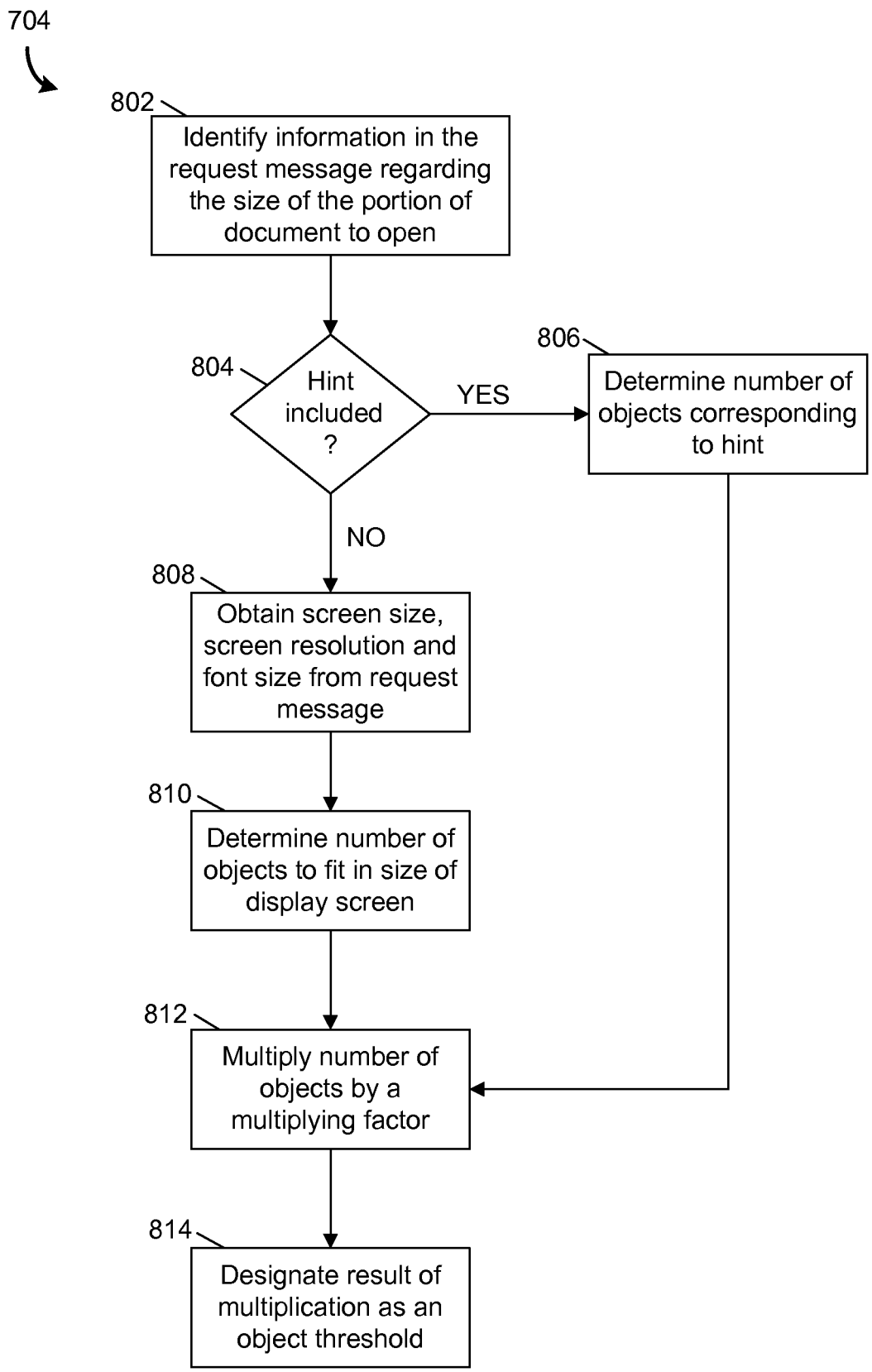
FIG. 8 shows an example method for determining an object threshold for the portion of the document to be opened in FIG. 7.

FIG. 8 shows an example flowchart of a method 704 for determining an object threshold for the portion of the document to be opened. At operation 802, information is identified in the request message sent from client computer 102 to server computer 112 regarding the size of the portion of the document to open. The size of the portion of the document to open may be included in one or more parameters included in the request message.

At operation 804, a determination is made as to whether a hint regarding the object threshold size is included in the request message. The hint may be included in the one or more parameters or the hint may be included elsewhere in the request message. The hint, if included in the request message, provides a number of objects corresponding to the object threshold for the portion of the message to be opened by server computer 112 and sent to client computer 102.

When it is determined that a hint is included in the request message, at operation 806, the number of objects identified in the hint is extracted from the request message. When it is determined that a hint is not included in the request message, at operation 808, other information regarding the object threshold is extracted from the request message. The other information, typically included in one or more parameters in the request message, may includes items such as the size of the display screen on client computer 102, the size of the font being used and the screen resolution in pixels for the display screen. Other types of information are also possible.

At operation 810, the information obtained from operation 808 is used to determine the number of objects that fit in the size of the display screen. For example, if the size of the display screen is known and the size of the font used on the display screen is known and the average size of an object is known, an estimate of a number of objects that can fit in the size within the size of the display screen can be obtained.

At operation 812, the number of objects obtained in the calculation at operation 810 or the number of objects obtained at operation 806 as a results of the hint included in the request message are multiplied by a multiplying factor. The multiplying factor is used to determine the object threshold. The multiplying factor is typically a multiple of a page size. For example a multiplying factor of 2 indicates a size corresponding to two pages and a multiplying factor of 1.5 indicates a size corresponding to a half-page. In examples, other multiplying factors can be used.

At operation 814, the result of the multiplication at step 812 is designated as the object threshold. For example, if the multiplication factor is 1.5, the number of objects in the object threshold corresponds to the number of objects that fit within the size of the display screen plus the number of objects that fit within the size of half a display screen.

With reference to FIG. 9, example components of client computers 102, 104 and server computer 112 are shown. In example embodiments, client computers 102, 104 and server computer 112 are computing devices. Client computers 102, 104 and server computer 112 can include input/output devices, a central processing unit ("CPU"), a data storage device, and a network device.

In a basic configuration, client computers 102, 104 and server computer 112 typically include at least one processing unit 902 and system memory 904. Depending on the exact configuration and type of computing device, the system memory 904 may be volatile (such as RAM), non-volatile (such as ROM, flash memory, etc.) or some combination of the two. System memory 904 typically includes an operating system 906 suitable for controlling the operation of a networked personal computer, such as the Windows® operating systems from Microsoft Corporation of Redmond, Wash. or a server, such as Microsoft Exchange Server 2007, also from Microsoft Corporation of Redmond, Wash. The system memory 904 may also include one or more software applications 908 and may include program data.

Client computers 102, 104 and server computer 112 may have additional features or functionality. For example, client computers 102, 104 and server computer 112 may also include computer readable media. Computer readable media can include both computer readable storage media and communication media.

Computer readable storage media is physical media, such as data storage devices (removable and/or non-removable) including magnetic disks, optical disks, or tape. Such additional storage is illustrated in FIG. 9 by removable storage 910 and non-removable storage 912. Computer readable storage media may include volatile and nonvolatile, removable and non-removable media implemented in any method or technology for storage of information, such as computer readable instructions, data structures, program modules, or other data. Computer readable storage media can include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by client computers 102, 104. Any such computer readable storage media may be part of client computers 102, 104. The client computers 102, 104 may also have input device(s) 914 such as keyboard, mouse, pen, voice input device, touch input device, etc. Output device(s) 916 such as a display, speakers, printer, etc. may also be included.

Client computers 102, 104 and server computer 112 may also contain communication connections 918 that allow the device to communicate with other computing devices 920, such as over a network in a distributed computing environment, for example, an intranet or the Internet. Communication connection 918 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The various embodiments described above are provided by way of illustration only and are not be construed to limiting. Various modifications and changes that may be made to the embodiments described above without departing from the true spirit and scope of the disclosure.

What is claimed is:

1. A method for partially loading a document on a client for conserving client resources by loading portions of the document, the method comprising:
    sending a first request to a server computer to open a first portion of the document, wherein the first portion of the document includes less than an entire portion of the document, and wherein the first request includes a parameter specifying a size of a display on a client computer;
    receiving the first portion of the document from the server computer, along with an indication whether more of the document is available;
    rendering a second portion of the first portion of the document on the client display, the second portion comprising a subset of the first portion;
    scrolling to a second part of the first portion of the document, wherein the second part of the first portion of the document follows the second portion of the document; and
    in response to scrolling to the second part of the first portion of the document:
        rendering the second part of the first portion of the document on the display;
        sending a second request to the server computer to receive a third portion of the document from the server computer, wherein the third portion of the document follows the first portion of the document; and
        receiving the third portion of the document from the server computer.

2. The method of claim 1, further comprising determining whether more of the document is available at the server computer in response to scrolling to the second part of the first portion of the document.

3. The method of claim 1, further comprising unloading at least part of the second portion of the document from the client in response to scrolling to the second part of the first portion of the document.

4. The method of claim 1, wherein the first request to the server computer to open the first portion of the document identifies a number of objects to be included in the first portion of the document.

5. The method of claim 4, wherein sending the first request to the server computer further comprises determining a predetermined number of objects in the second portion of the document.

6. The method of claim 5, wherein each object in the predetermined number of objects is a top-level object, each of the top-level objects is one of a paragraph, a table, a list or a picture.

7. The method of claim 1, wherein the first portion of the document is larger than the size of the display on the client.

8. The method of claim 7, wherein the second portion of the document is the size of the display on the client.

9. The method of claim 7, wherein the third portion of the document is similar in size to the second part of the first portion of the document.

10. A computing device for partially loading a document on a client for conserving client resources by loading portions of the document, comprising:
    a processing unit;
    a memory including instructions, which when executed by the processing unit, cause the computing device to:
        send a first request to a server computer to open a first portion of the document, wherein the first portion of the document includes less than an entire portion of the document, and wherein the first request includes a parameter specifying a size of a display on a client computer;
        receive the first portion of the document from the server computer, along with an indication whether more of the document is available;
        render a second portion of the first portion of the document on the client display, wherein the second portion comprises a subset of the first portion;
        scroll to a second part of the first portion of the document, wherein the second part of the first portion of the document follows the second portion of the document; and
        in response to scrolling to the second part of the first portion of the document:
            render the second part of the first portion of the document on the display;
            send a second request to the server computer to receive a third portion of the document from the server computer, wherein the third portion of the document follows the first portion of the document; and
            receive the third portion of the document from the server computer.

11. The computing device of claim 10, wherein the instructions further cause the computing device to determine whether more of the document is available at the server computer in response to scrolling to the second part of the first portion of the document.

12. The computing device of claim 10, wherein the instructions further cause the computing device to unload at least part of the second portion of the document from the client in response to scrolling to the second part of the first portion of the document.

13. The computing device of claim 10, wherein the first request to the server computer to open the first portion of the document identifies a number of objects to be included in the first portion of the document.

14. The computing device of claim 13, wherein to send the first request to the server computer further comprises determining a predetermined number of objects in the second portion of the document.

15. The computing device of claim 10, wherein the first portion of the document is larger than the size of the display on the client.

16. The computing device of claim 15, wherein the second portion of the document is the size of the display on the client.

17. The computing device of claim 15, wherein the third portion of the document is similar in size to the second part of the first portion of the document.

18. A computer-readable storage device comprising instructions to partially load a document on a client for conserving client resources by loading portions of the document, which when executed by a computing device, cause the computing device to:

send a first request to a server computer to open a first portion of the document, wherein the first portion of the document includes less than an entire portion of the document, and wherein the first request includes a parameter specifying a size of a display on a client computer;

receive the first portion of the document from the server computer, along with an indication whether more of the document is available;

render a second portion of the first portion of the document on the client display, wherein the second portion comprises a subset of the first portion;

scroll to a second part of the first portion of the document, wherein the second part of the first portion of the document follows the second portion of the document; and in response to scrolling to the second part of the first portion of the document:

render the second part of the first portion of the document on the display;

send a second request to the server computer to receive a third portion of the document from the server computer, wherein the third portion of the document follows the first portion of the document; and receive the third portion of the document from the server computer.

* * * * *